July 8, 1930. E. G. ENTICKNAP 1,770,303
MACHINE FOR THE MANUFACTURE OF CONCRETE BLOCKS AND THE LIKE
Filed May 14, 1928 4 Sheets-Sheet 2

Inventor
Ernest G. Enticknap
By
Attorney

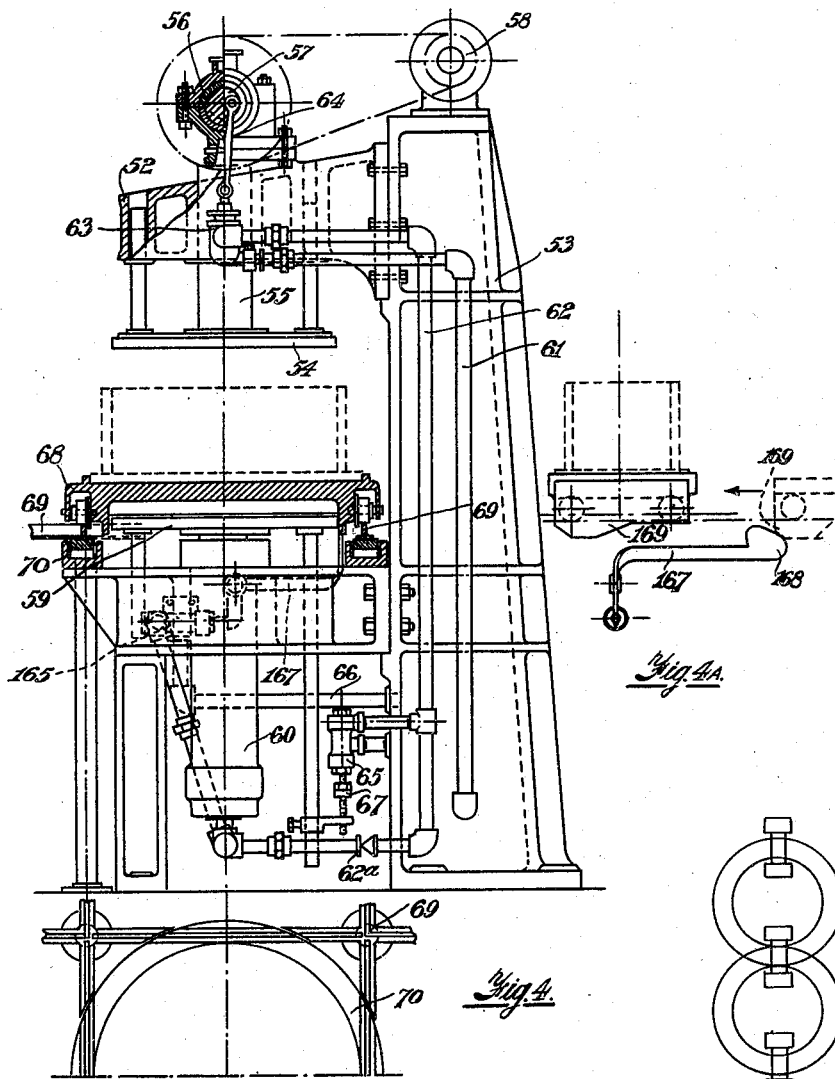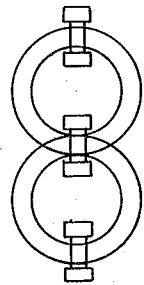

Patented July 8, 1930

1,770,303

UNITED STATES PATENT OFFICE

ERNEST GEORGE ENTICKNAP, OF ALTON, ENGLAND

MACHINE FOR THE MANUFACTURE OF CONCRETE BLOCKS AND THE LIKE

Application filed May 14, 1928, Serial No. 277,753, and in Great Britain July 4, 1927.

This invention relates to machines for manufacturing concrete blocks, bricks, cores and like articles formed by pressing compounded materials, plastic or semi-plastic bodies or the like, and the object of the invention is to provide a machine which will be largely automatic in action, simple in construction, and which will produce moulded articles uniform in density, homogeneous in texture and free from laminations.

The invention also provides means for feeding the machine with prefilled moulds, aligning same upon the press member, reducing the material automatically to a desired consistency, removing the mould box and the moulded article therein and refilling the box for cyclic operation.

The invention consists essentially in providing a machine whereby the material to be moulded is subjected to a progressively increasing tamping pressure. This may be effected by providing the machine with a reciprocating tamping head and with a supporting table for the work which moves the work towards the tamping head as the reduction or consolidation of the work proceeds.

In the preferred form of construction according to the present invention, however, the material to be moulded is subjected to a simultaneous pressing and tamping operation while it remains in a stationary mould.

Reference will now be made to the accompanying drawings in which:—

Figure 1:
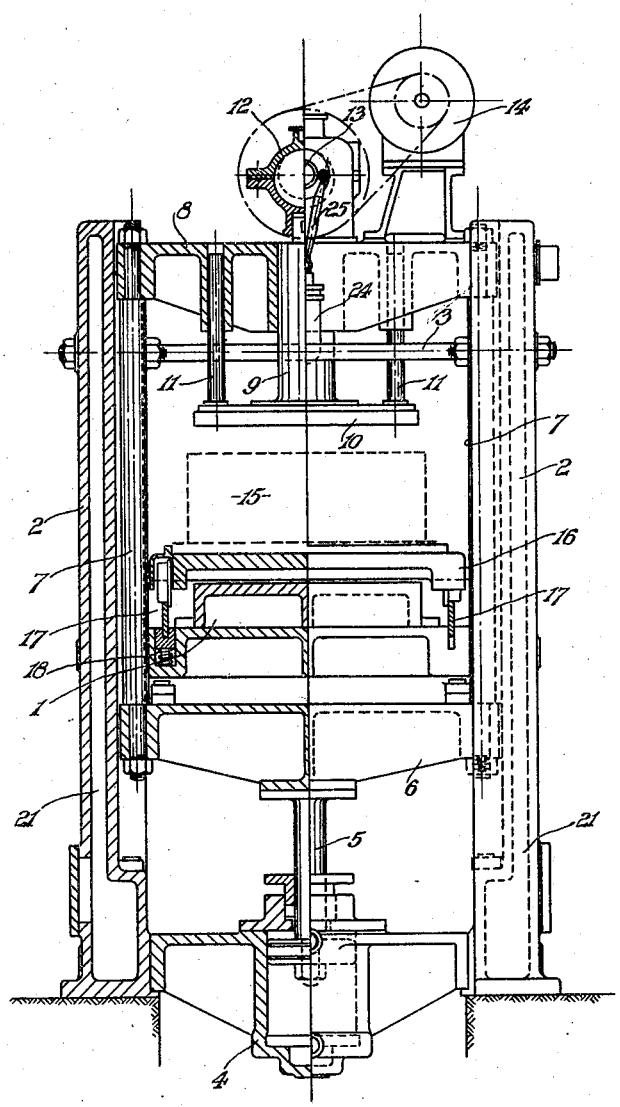
Figure 2:
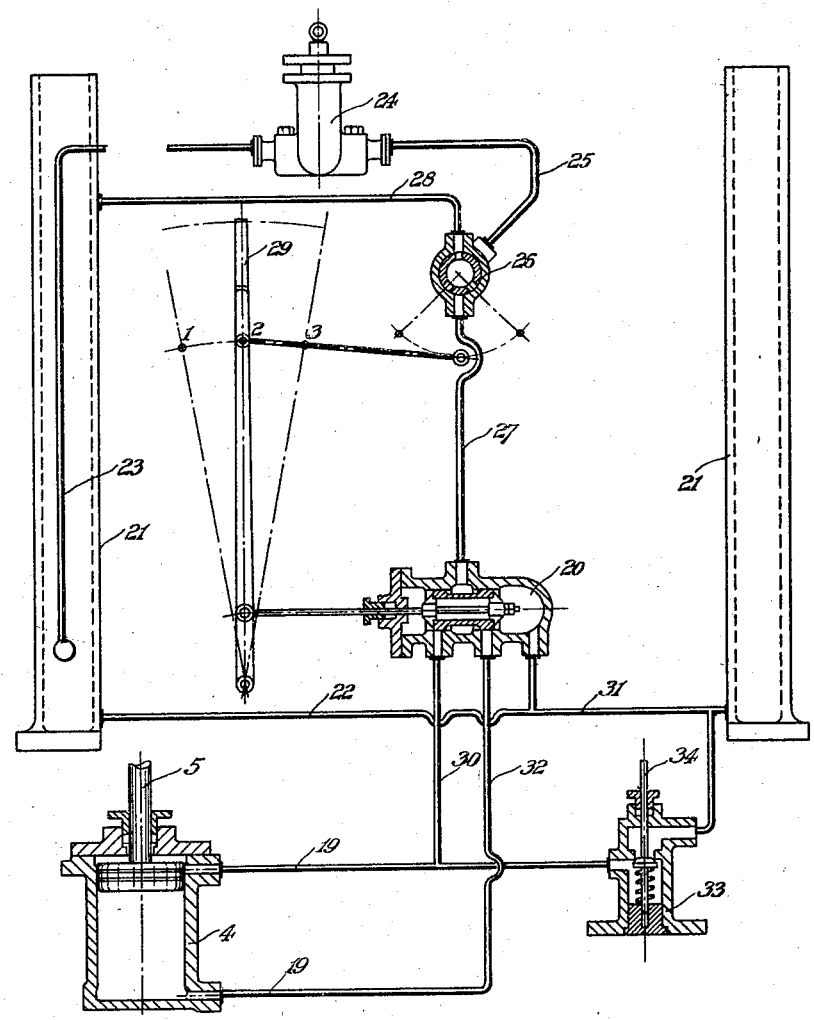
Figure 3:
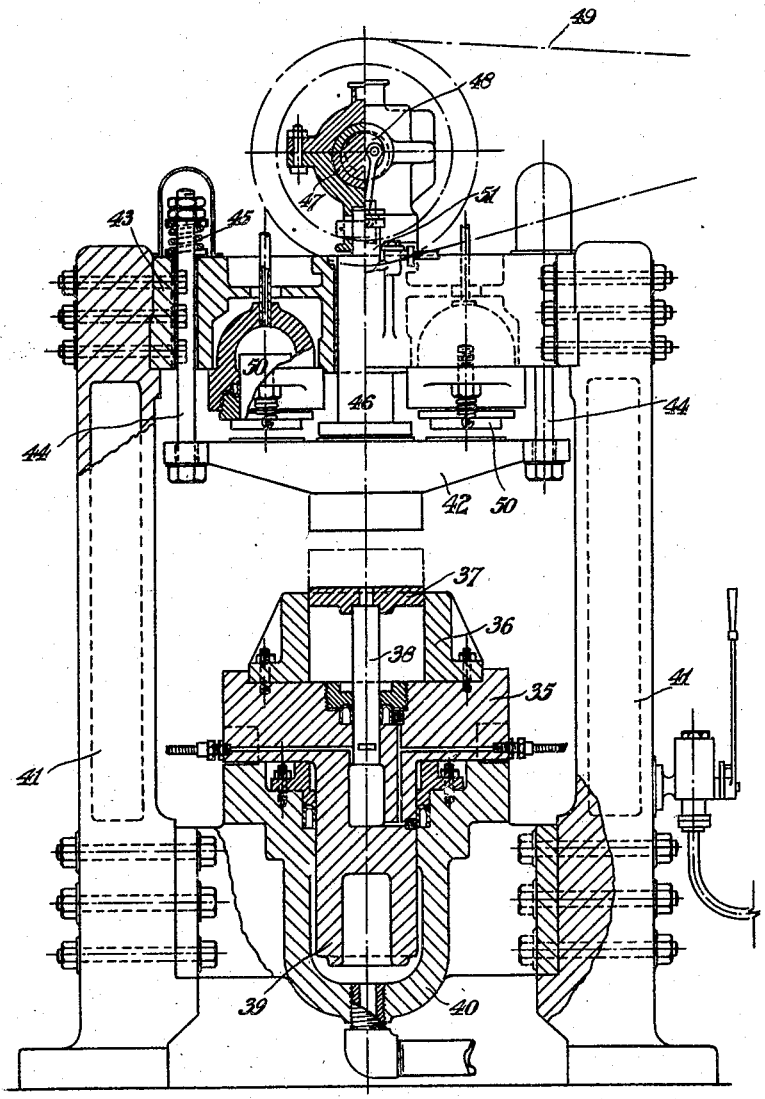

Figure 1 is a front elevation of a machine having a stationary supporting table for the work, Figure 2 is a diagram showing the arrangement of the controls on the machine shown in Figure 1, Figure 3 is a front elevation of a modified machine in which there is a combined pressing and tamping head, but in which the supporting table for the work is arranged to move towards the head as the reduction or consolidation of the work proceeds, Figure 4 is a side elevation of a modified machine in which the frame is open on three sides so as to enable the finished moulds to be moved away from the machine in a direction at right angles to the direction in which the newly filled moulds are moved into the machine, Figure 4a is another view of the same machine showing the automatic valve operating gear provided thereon, Figure 5 shows a method of feeding by means of circular and rotary tracks.

The machine shown in Figure 1 has a stationary press platen or work supporting table 1 which forms part of a rigid structure, comprising vertical side frames 2 connected together by transverse tie bars 3.

Disposed within the structure thus formed and preferably below the platen 1 is an hydraulic cylinder 4 having a ram 5 supporting a cross head 6 which is guided in the side frames 2 and connected by vertical pillars 7 to a head 8, also guided in the side frames 2.

A hollow reciprocating piston 9 working in a cylinder formed in the head 8 carries a tamping and pressing element 10 guided by means of pins 11 on the tamping element sliding in guides in the head, and is operated by any suitable means, such as an eccentric 12 on a shaft 13 connected by a belt drive to an electric motor 14 carried on the head 8.

The mould boxes 15 are arranged to be run on to and off the platen 1 on trolleys 16 running on rails having depressible sections 17 supported on springs 18 on the platen 1, these springs being designed to be compressed under the pressure of the hydraulic ram 5 so that the mould box will bear directly on the platen 1. Alternatively in any of the views shown the moulding boxes may be fitted with wheels, and the trolley dispensed with.

The hydraulic cylinder 4 is double acting, and is supplied with pressure fluid through pressure lines 19 (see Figure 2) under the control of a hand-operated valve 20.

The pressure fluid is stored in reservoirs 21 which may conveniently be formed in the side frames 2 as shown in Figure 1, these reservoirs being connected at their lower ends by a pipe 22, and one of them being connected through a pipe 23 to the suction side of a pump 24.

The pump 24 is mounted on the head 8 as shown in Figure 1, and operated through a connecting rod 25 from a crank on the shaft 13. The delivery side of the pump is connected through a pipe 25 to a three-way valve 26, through which the pressure fluid coming from the pump may either be delivered through a pipe 27 to the hand control valve 20 or returned through a pipe 28 to the reservoir.

The valves 20 and 26 are controlled by a handle 29 having three positions, marked 1, 2 and 3 on the drawings. In the position 1 the valve 26 connects the pipe 25 to the pipe 27 to deliver pressure fluid through the valve 20 and pipe 30 to the upper end of the cylinder 4 so that the ram 5 is moved downwards by the operation of the pump 24, the pressure fluid already in the cylinder 4 being exhausted through the pipes 19 valve 20 and pipe 31.

In the second position of the handle 29 the valve 26 shuts off the supply of pressure fluid to the pipe 27 and allows the delivery from the pump 24 to escape through the pipe 28 directly to the reservoir. At the same time the valve 20 shuts off the supply to the pipe 30 and cuts off the exhaust from the cylinder 4, thus holding the ram 5 against movement.

In the third position of the handle 29 the valve 26 cuts off the escape through the pipe 28 and again delivers pressure fluid from the pump 24 through the pipe 27 to the valve 20, but in this position the valve 20 delivers pressure fluid through the pipe 32 to the lower end of the cylinder 4 so that the ram is moved upwards by the operation of the pump 24, the pressure fluid in the cylinder 4 being exhausted through the pipe 30, valve 20 and pipe 31 to the reservoir.

In order that the downward movement of the ram 5 may be stopped automatically when the material under treatment has been reduced to a predetermined thickness, an automatic pressure relief valve 33 is connected between the pipe 30 and reservoir 21, such valve having a stem 34 adapted to be engaged and depressed by an adjustable element on the head 8 or crosshead 6 so as to act as a bypass and to prevent the further delivery of fluid under pressure to the pipe 30 when the thickness of the material under treatment has been reduced to the predetermined dimension.

In the the operation of the apparatus shown in Figures 1 and 2 after a charged mould box has been run on to the press platen 1, the motor 14 being in operation, the handle 29 is moved to the position 1 whereupon the pump 24 supplies pressure fluid through the pipes 25 and 27 valves 26 and 20, and pipes 30 and 19 to the cylinder 4 and moves the head 8 progressively downwards towards the mould box 5. As this motion proceeds the material is subjected to progressively increasing tamping pressure by the downward movement of the head until it is reduced to the predetermined thickness whereupon the valve 33 is operated automatically to release the pressure thus preventing further downward movement of the head 8.

After the treatment of the work is concluded the operator moves the handle 29 to the position 3 whereupon the ram 5 is moved upward to raise the head 8 clear of the work, thus enabling the mould box 15 to run off the press platen 1 and permitting a new mould box to take its place.

At any time during the tamping and pressing operation the operator can release the pressure and thus arrest the action by moving the handle 29 to the position 2.

Figure 3 shows a modified form of construction of the machine more specially designed for the manufacture of bricks and like articles in which the press platen 35 is provided with a mould box 36 permanently fixed thereon and having an ejector 37 for the finished brick operated by a hydraulic ram 38 working in a cylinder in the press platen.

In this machine the press platen is carried by a ram 39 working in a cylinder 40 fixed to the side frames 41 and is adapted to be moved vertically towards a tamping and pressing element 42 carried by a fixed crosshead 43.

The tamping element 42 is carried by pillars 44 sliding in guides in the head 43 and supported on coil springs 45 as shown, tamping movement being imparted to the element 42 by means of a reciprocating piston 46 sliding in a cylinder formed in the head 43 and operated by an eccentric 47 on a shaft 48 mounted in bearings on the head 43 and driven by a belt 49.

In order to enable a final increased pressure to be applied to the tamping element 42 when the material in the mould boxes 36 has been sufficiently reduced or consolidated, one or more hydraulic rams 50 are provided working in cylinders in the head 8 and adapted to press the element 42 towards the press platen 35.

A hydraulic pump 51 similar to the pump 24 shown in Figure 1 and operated through a connecting rod by an eccentric on the shaft 48 is provided on the head 43 for the purpose of supplying hydraulic pressure.

Figure 4 of the drawings shows a further modified machine designed to be open on three sides so as to enable the finished work to be moved away from the machine in a direction at right angles to the direction in which the work is moved into the machine.

In the form shown, the head 52 is supported by a single side frame 53 and has a tamping element 54 to which tamping movement is imparted by a reciprocating piston 55 working in a cylinder formed on the head 52, and operated by an eccentric 56 on a shaft 57 journalled on the head. As shown, the shaft 57 is driven through a belt by an electric motor 58. The press platen 59 is carried on a ram working in a hydraulic cylinder 60 whereby it can be moved towards or away from the tamping head. The pressure fluid is contained in a suitable reservoir which may be formed in the side frame 53, and is adapted to be drawn from this reservoir through a pipe 61 and delivered under pressure through a pipe 62 by a pump 63 mounted on the head 52 and operated through a connecting rod 64 by an eccentric on the shaft 57. The pipe 62 is connected through a check valve 62a to the cylinder 60. An automatic pressure relief or by-pass valve 65 connected between the pressure pipe 62 and a by-pass pipe leading to the reservoir 55 is arranged to be opened by an adjustable stop 67 on the press platen 59 when the material in the mould box has been reduced to the predetermined thickness so as to release the pressure in the pipe 62 and thus prevent further movement of the press platen.

The material to be treated is filled into mould boxes supported on trolleys 68 running on rails 69, there being two sets of rails at right angles to one another, one for the filled mould boxes being delivered to the machine and one for the finished mould boxes being led away from the machine.

In order to enable the mould boxes to be transferred from the one set of rails to the other a turntable 70 mounted on a fixed support concentrically with the press platen 59 is provided.

An automatic valve 165 is connected between the cylinder 60 and an outflow pipe 66 leading to the reservoir, such valve being operated by a bell crank lever 167 having a projection 168 adapted to be engaged by a cam plate 169 provided on the trolley 68. The cam plate is so designed that when a filled trolley is brought up to the press as shown in Figure 4a the lever 167 is depressed to open the valve 165, but when the previous trolley has been removed and the filled trolley moved into position over the press platen 59, the projection 168 is released by the cam plate 169, thus permitting the valve 165 to close.

In the operation of this machine after the filled boxes have been run on to the turntable and brought into registration with the tamping head, the shaft 57 is set in rotation so as to give the necessary tamping movement to the head and to operate the pump 63, thus supplying pressure fluid to the cylinder 60 and lifting the press platen 59. In order to ensure accurate registration, the press platen may have projecting pins (not shown) adapted to engage in corresponding recesses in the trolley or mould box. This device may also be applied, where applicable, in any of the other forms of the machine described herein.

The mould box is carried towards the head by the motion of the press platen 59, and receives a progressively increasing tamping pressure which continues until the material in the mould box has been sufficiently reduced or consolidated. This point is determined by the thickness of the material in the mould, and when it is reached the valve 65 is operated automatically by the stop 67 so as to release the pressure in the cylinder 60 and prevent further movement of the press platen. When this has been done the operator moves a filled mould on a trolley 68 up to the machine, with the result that the automatic valve 165 is opened to allow the press platen to return by gravity to its initial position, thus depositing the finished mould box with its trolley on the turntable 70. The trolley 68 is then transferred to the desired set of rails 69 and removed from the machine. This enables the new trolley with its mould box to be moved into position over the press platen, and when this has been done the valve 165 closes automatically and the platen then moves upward under the hydraulic pressure supplied by the pump 63.

In Figure 5 a double circular track is shown feeding three machines, the wheels of the moulding boxes or trolleys 16, 68, or 80 being set to take the curve. In a modification a single track may be used, and this may rotate, thus acting as a conveyor, the boxes in such case moving with the track.

I claim:—

1. A machine for the manufacture of molded articles, concrete blocks and the like, comprising a framework, an upper tamping member and a lower press platen carried by said framework, said lower press platen being movable toward and away from said tamping member, sets of track rails running in different directions from said machine, moulding boxes movable on said track rails, a turntable supported by said framework concentrically with said press platen, and track rails carried by said turntable and adapted to be brought into alignment with any of said sets of track rails for transferring the moulding boxes from one set of said rails to another.

2. A machine for the manufacture of moulded articles, concrete blocks and the like comprising a tamping element operated by an eccentric and connecting rod or like means and an hydraulic pressing element operated under the control of valves so arranged that the pressing member is retracted automatically when a filled mould is brought near to the machine and is automatically advanced for the purpose of applying progressively increasing tamping pressure to the work when the finished mould has been removed and the newly filled mould has been moved into position in the machine.

3. A machine for the manufacture of moulded articles, including a mould, means for subjecting the material in said mould to a progressively increasing tamping pressure, and means for subsequently exerting a steady top and bottom pressure upon the material in the mould.

4. A machine for the manufacture of moulded articles, including a support for a mould, a press head disposed above said support, a reciprocating tamping head mounted on said press head, means for continuously reciprocating said tamping head relatively to said press head and means for effecting a continuous relative motion of said support and press head towards each other.

In witness whereof I affix my signature.

ERNEST GEORGE ENTICKNAP.